US008112257B2

(12) United States Patent
Weber et al.

(10) Patent No.: US 8,112,257 B2
(45) Date of Patent: Feb. 7, 2012

(54) SEMANTIC EXTENSIONS OF BUSINESS PROCESS MODELING TOOLS

(75) Inventors: Ingo Weber, Mannheim (DE); Florian Doerr, Plankstadt (DE); Christian Brelage, Muenster (DE); Matthias Born, Albstadt (DE)

(73) Assignee: SAP AG, Walldorf (DE)

( * ) Notice: Subject to any disclaimer, the term of this patent is extended or adjusted under 35 U.S.C. 154(b) by 846 days.

(21) Appl. No.: 11/831,629

(22) Filed: Jul. 31, 2007

(65) Prior Publication Data

US 2009/0037237 A1    Feb. 5, 2009

(51) Int. Cl.
  *G06G 7/56* (2006.01)
  *G06Q 10/00* (2006.01)
(52) U.S. Cl. .......................................... 703/6; 705/348
(58) Field of Classification Search .......... 703/2; 705/7, 705/50, 348
See application file for complete search history.

(56) References Cited

U.S. PATENT DOCUMENTS

| 2004/0083199 | A1* | 4/2004 | Govindugari et al. | 707/1 |
| 2005/0065903 | A1* | 3/2005 | Zhang et al. | 707/1 |
| 2006/0174222 | A1* | 8/2006 | Thonse et al. | 717/106 |
| 2007/0112718 | A1* | 5/2007 | Liu et al. | 706/47 |

OTHER PUBLICATIONS

"Object Management Group (OMG) & Business Process Management Initiative (BPMI)", http://bpmn.org/, (Copyright 2005),2 pgs.
"OWL Web Ontology Language Overview", http://www.w3.org/TR/owl-features/, W3C Recommendation,(2004),17 pgs.
"OWL-S: Semantic Markup for Web Services. OWL-S", http://www.daml.org/services/owl-s/1.1/, Version 1.1,(2004),3 pgs.
"SUPER Stadium", http://stadium.open.ac.uk/super/, (2006),1 pg.
"WSMX—Web Service Execution Environment", http://www.wsmx.org/, (Copyright 2005),3 pgs.
Chapman, Sam , "University of Sheffield—Natural Language Processing Group 2006, String Similarity Metrics", http://www.dcs.shef.ac.uk/~sam/stringmetrics.html, (2006),17 pgs.
Cohen, W W., et al., "A Comparison of String Distance Metrics for Name-Matching Tasks", *International Joint Conferences on Artificial Intelligence (IJCAI) Proceedings, Acapulco, Mexico, Aug. 9-15,* (2003),1-6.
De Bruijn, Jos , et al., "Web Service Modeling Ontology (WSMO)", http://www.w3.org/Submission/WSMO/, W3C Member Submission 3,(Jun. 2005),35 pgs.
Feier, Cristina , et al., "D3.1v0.2 WSMO Primer", http://www.wsmo.org/TR/d3/d3.1/v0.2/20050401, WSMO Working Draft 01,(Apr. 2005),39 pgs.
Hepp, M. , et al., "Semantic business process management: a vision towards using semantic Web services for business process management", *IEEE International Conference on e-Business Engineering, 2005. ICEBE 2005.,* (2005),535-540.
Ryndina, K. , et al., "Consistency of Business Process Models and Object Life Cycles", *Workshops and Symposia at MoDELS 2006. LNCS 4364,* (2006),80-90. Weber, I. , et al., "A Conceptual Framework for Composition in Business Process Management", *BIS 2007: Proceedings of the 10th International Conference on Business Information Systems*, Poznan, Poland,(Apr. 2007),54-66.

* cited by examiner

*Primary Examiner* — Paul Rodriguez
*Assistant Examiner* — Andre Pierre Louis
(74) *Attorney, Agent, or Firm* — Schwegman, Lundberg & Woessner, P.A.

(57) ABSTRACT

A method and a system directed to semantically annotating business process modeling components of a business process model are described. For example, a definition of a business process modeling component and an association of a domain element with the business process modeling component are received. Then, the definition of the business process modeling component is semantically annotated using the domain element.

14 Claims, 18 Drawing Sheets

SEMANTIC EXTENSIONS OF BUSINESS PROCESS MODELING TOOLS

BACKGROUND

Example embodiments relate generally to the technical field of business process modeling.

BRIEF DESCRIPTION OF THE DRAWINGS

Some embodiments are illustrated by way of example. It is intended that the embodiments and figures disclosed herein are to be considered illustrative rather than limiting.

DETAILED DESCRIPTION

Modeling tools for business processes need to be augmented with functionalities to support users in providing additional information beyond the usual graphical layout world. This is done by semantically annotating business process models. In other words, graphical representations of business process models need to be infused (semantically annotated) with information beyond the information provided by the graphical layout. Semantic pieces of information may then contribute to couple process models closer to specific domains, to facilitate the realization of process models, and to ease querying the set of business processes in an enterprise, e.g. by answering questions regarding which objects are manipulated within which business process models. The semantic annotation of business process models can be realized in a separate standalone tool or be integrated into a graphical business process modeling tool.

In the practice of modeling of business processes, the Business Process Modeling Notation (BPMN) developed by the Business Process Management Initiative (BPMI) has been released as a standard for modeling business processes. For clarity, the embodiments below focus on business process modeling tools supporting BPMN as a notation for graphical business process models. It will be evident to one skilled in the art, however, that other notations, such as, but not limited to the Business Process Execution Language (BPEL) or the Unified Modeling Language (UML), may be supported and semantically extended in the same way as BPMN notation.

Furthermore, any components of BPMN, or other notation, can be extended and specified. For clarity, the embodiments below focus on a limited set of business process modeling components: data objects, associations, and modeling elements (modeling elements representing activities/tasks in particular). It will be evident to one skilled in the art, however, that other types of modeling elements and modeling components can be extended and specified in the same way as those described below.

Figure 1:
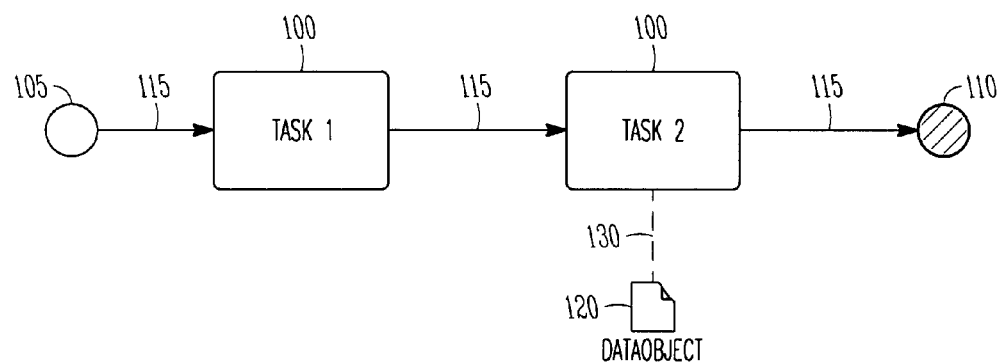
FIG. 1 is a diagram illustrating the use of data objects and associations to describe the model elements of a process model more precisely.

FIG. 1 shows how a data object 120 and an association 130 may be used to describe an activity or task 100 of a process model represented by model elements. More precisely, in some embodiments, the task 100 is described by associating data objects 120 with the task 100. For example, in some embodiments, a process is modeled by performing an initiation act 105 that starts the process. Tasks 100 for that process can also be defined and ordered using control flow connections 115 until the process is completed at the end 110 of the process. Data objects 120 related to certain tasks 100 can also be associated with tasks 100 in the process model by representing the association with an association link 130 between the task 100 and the data object 120.

Figure 2:
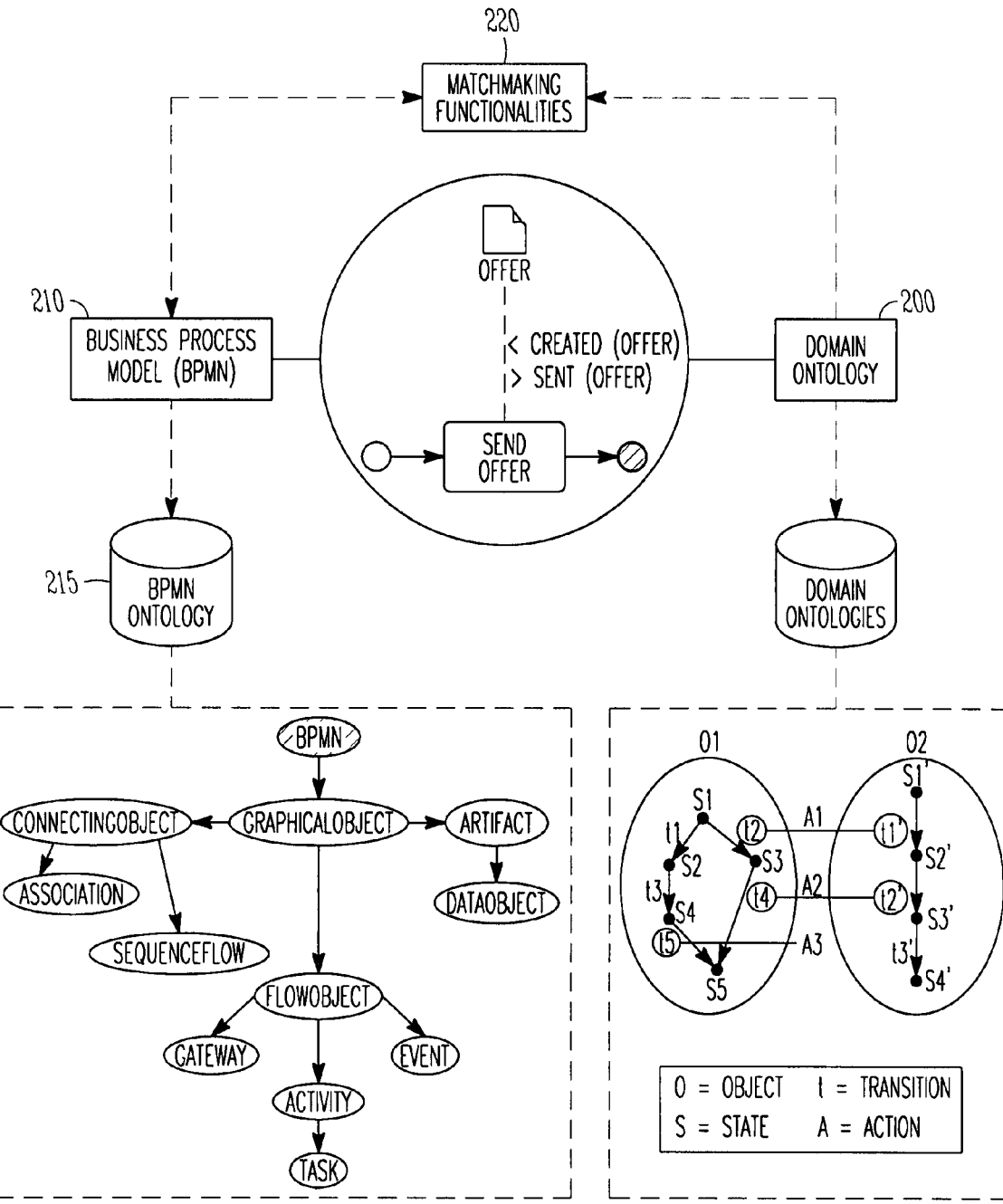
FIG. 2 is a diagram of an overview of the main components of an example embodiment.

FIG. 2 provides an initial overview of the main components in an example embodiment of the invention. In this embodiment, the business process model (BPMN) 210 is represented by a BPMN ontology 215. However, one of ordinary skill of the art would appreciate that the business process model can be represented in other forms as well. The business process model (BPMN) 210 defines all the modeling components that a user can use to model his or her process.

To provide additional information, different BPMN components can be extended and utilized. Data objects 120 may be used to identify the objects relevant in the scope of specific activities and associations 130 may be used to link the data objects 120 to corresponding activities in process diagrams such as FIG. 1. The user modeling the process can also name and define the activities, specify pre and post conditions for the activities in natural language, and define the objects, as well as the objects' states before and after an associated activity has been executed within the graphical model. An object's state is the status of an object at a particular instance; for example, a predecessor state of an object is the status of the object before the task that the object is associated with, while the successor state is the state of the object after the task that the object is associated with. The data object states will be discussed further below in example embodiments and in the discussion of domain ontologies. All this information can be used to semantically annotate business process models. Through the extending of business process modeling tools to allow semantic annotation, users will be supported in specifying this additional information during the graphical modeling phase of business processes.

To support users in annotating their process models, different matchmaking functionalities 220 utilize domain ontologies 200, which contain available domain elements that describe business process modeling components such as, but not limited to, object types and their states, action/task types (modeling element types), and other context information to help link model components to domain concepts.

Figure 3:
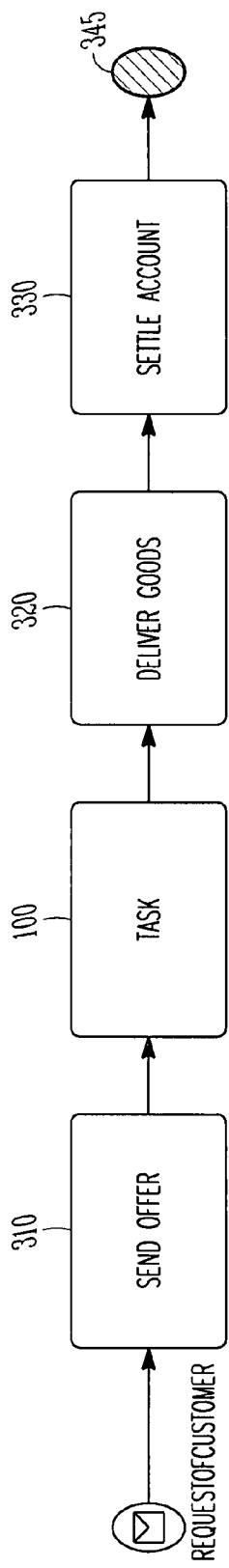
FIG. 3 is a block diagram illustrating a simplified model of a business process that can be created by a user of an example embodiment by connecting various model elements.

As FIG. 3 illustrates, a user may start modeling a new business process by creating and connecting various components within a diagram. In this very simplified request and order process, when a new customer request 340 arrives, an offer is sent (represented by the task "send Offer" 310) as an answer. When the customer orders something, this order will be processed (in FIG. 3, this task has yet to be defined and is represented by the "Task" block 100). Then the ordered goods will be delivered (represented by task "deliver Goods" 320) and finally, the payment of the goods takes place (represented by task "settle Account" 330) and the process is complete at 345. This simplified request and order process will be used below to help illustrate example embodiments of the present invention.

Figure 4:
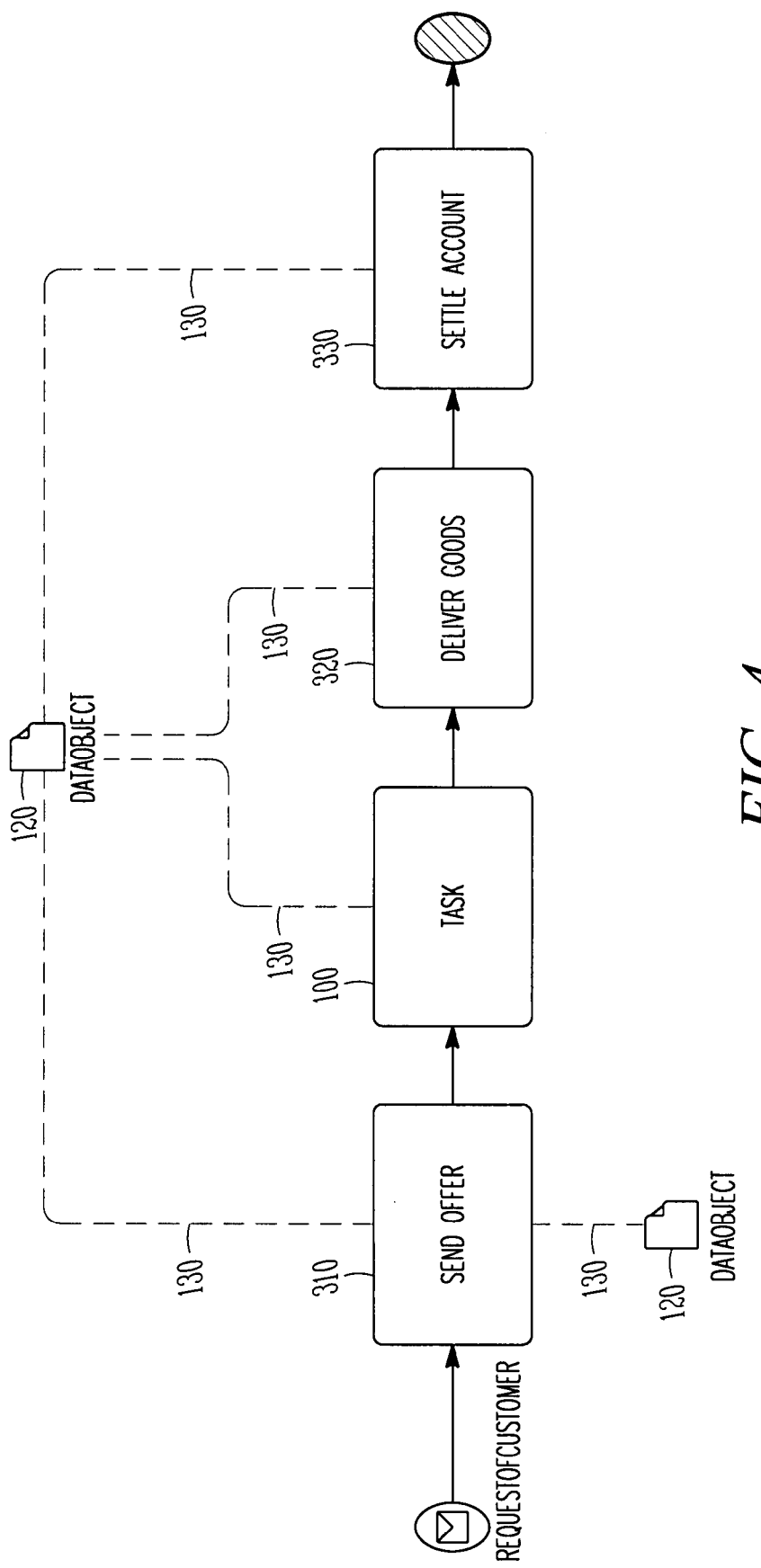
FIG. 4 is a block diagram illustrating data objects that a user of an example embodiment may connect to model elements via associations.

In order to specify the process model more precisely, as is shown in FIG. 4, a user may add and connect data objects 120 to the model elements 310, 100, 320, 330 via associations 130. These associations 130 can later be used to help define relevant objects and state transitions.

The semantic annotation of a business process model occurs by receiving a definition of a business process modeling component of a business process model (such as data objects 120, model elements (such as tasks 100), associations 130, etc.) and an association of a domain element with the business process modeling component and semantically annotating the definition of the business process modeling component using the domain element. The association of a domain element with the business process modeling component can be indicated by a user. In one embodiment, the user is presented with domain elements to aid her in indicating a domain element. These domain elements can be automatically identified by using domain ontologies and/or context information. Such embodiments will be discussed and clarified further below.

Figure 5:
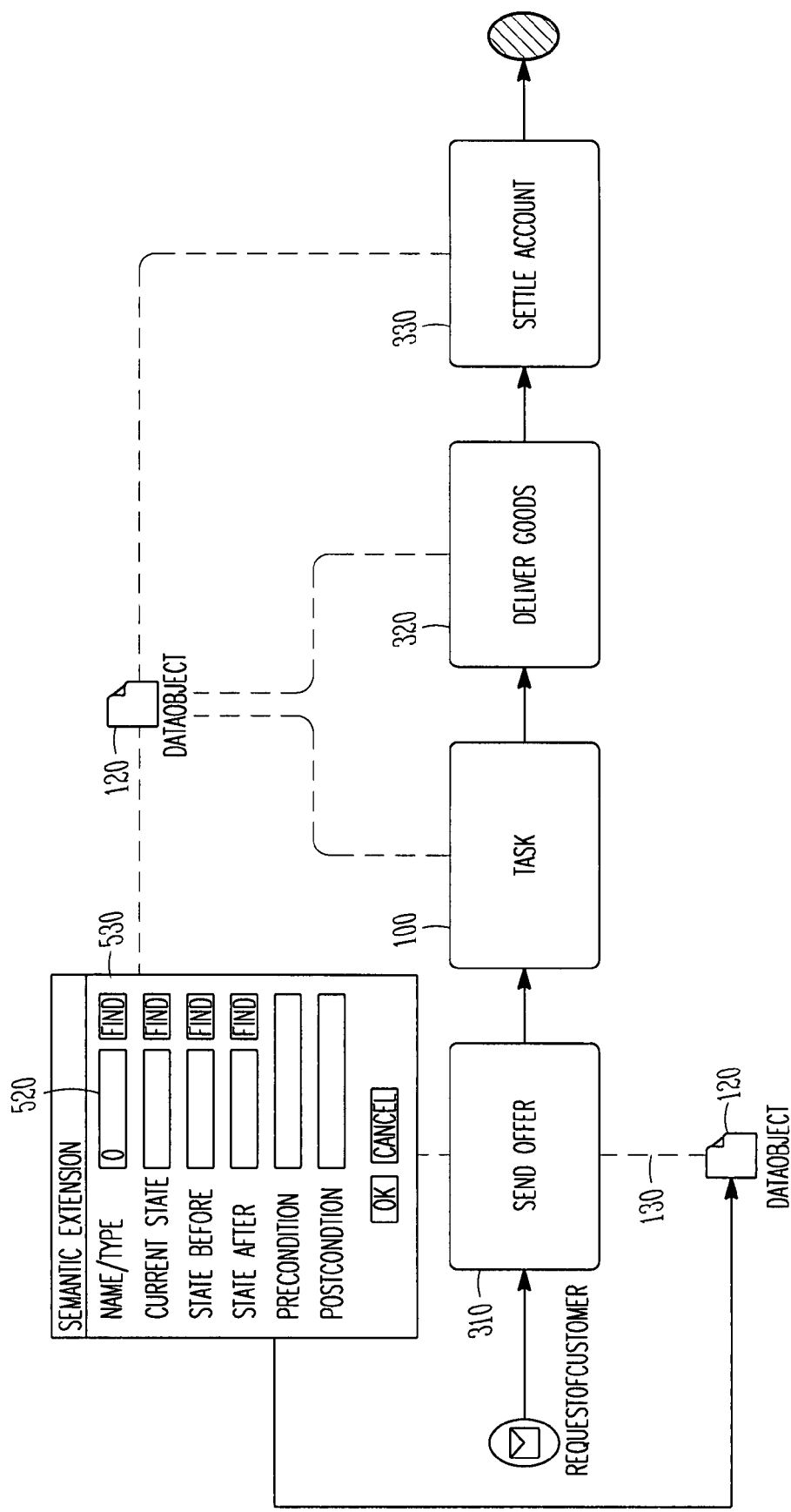
FIG. 5 is a diagram illustrating a user's ability to specify a data object or find appropriate descriptions derived from a domain ontology in an example embodiment.

FIG. 5 illustrates one example embodiment where a user can specify a data object 120 by selecting the object which causes a window 510 to appear to support the user in defining that object 120. The user can use additional discovery functionalities (in this embodiment, triggered by the find button 530) to help the user find appropriate domain element proposals from domain ontologies to describe the data object 120. The user can also input text descriptions 520 or any other user indication to aid the discovery functionalities in finding appropriate domain element proposals.

Figure 6:
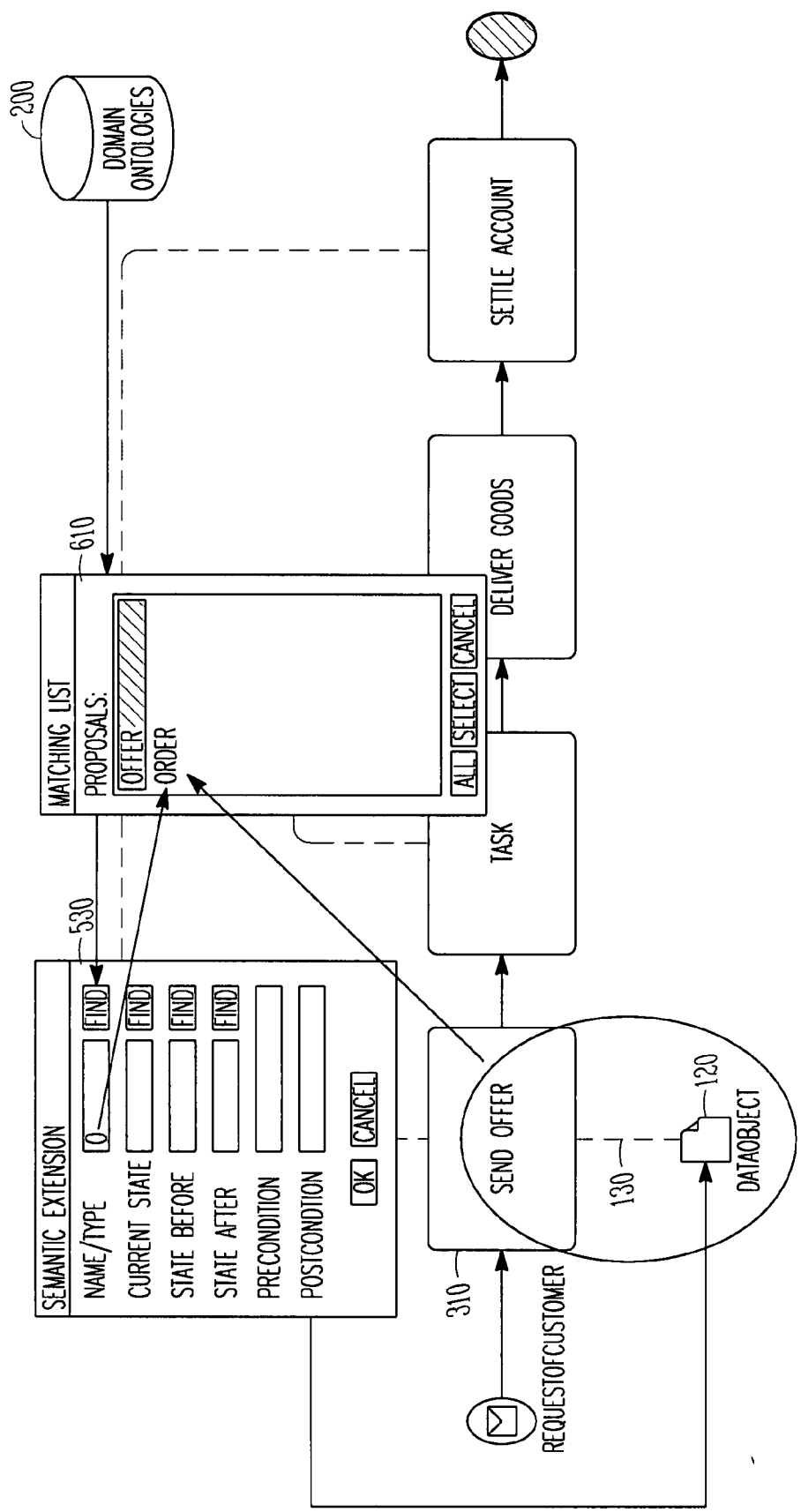
FIG. 6 is a diagram illustrating a list of proposals generated with the help of a domain ontology and information provided by the user in an example embodiment.

FIG. 6 illustrates an example embodiment where a user wanting to specify a data object 120 triggers the discovery functionalities which can use several methods to find appropriate domain element proposals. A new window 610 is then opened where the user is presented with the list of domain element proposals from which the user can select the desired domain element. The user also has the option of indicating the desired domain element from a full list of available domain elements describing a data object name/type.

In one example embodiment, the list is automatically generated with the help of a domain ontology 200 describing existing domain objects and possible states and with the help of context information provided by the user. The context information may include user input or indications, such as text, as well as information that can be derived from the neighborhood within the diagram (e.g. names/types of associated tasks, etc.) or the relationship between business process modeling components as shown in the diagram. In the example illustrated in FIG. 6, the domain element proposal list was generated using the domain ontology 200 information relating to task "send Offer" 310 and the user input in the text field 520 (Name/Type starts with "o"). If no appropriate object can be found, the user may input the data object name/type by typing in text in a text field (such as the Name/Type text field 520) or by any other means.

Figure 7:
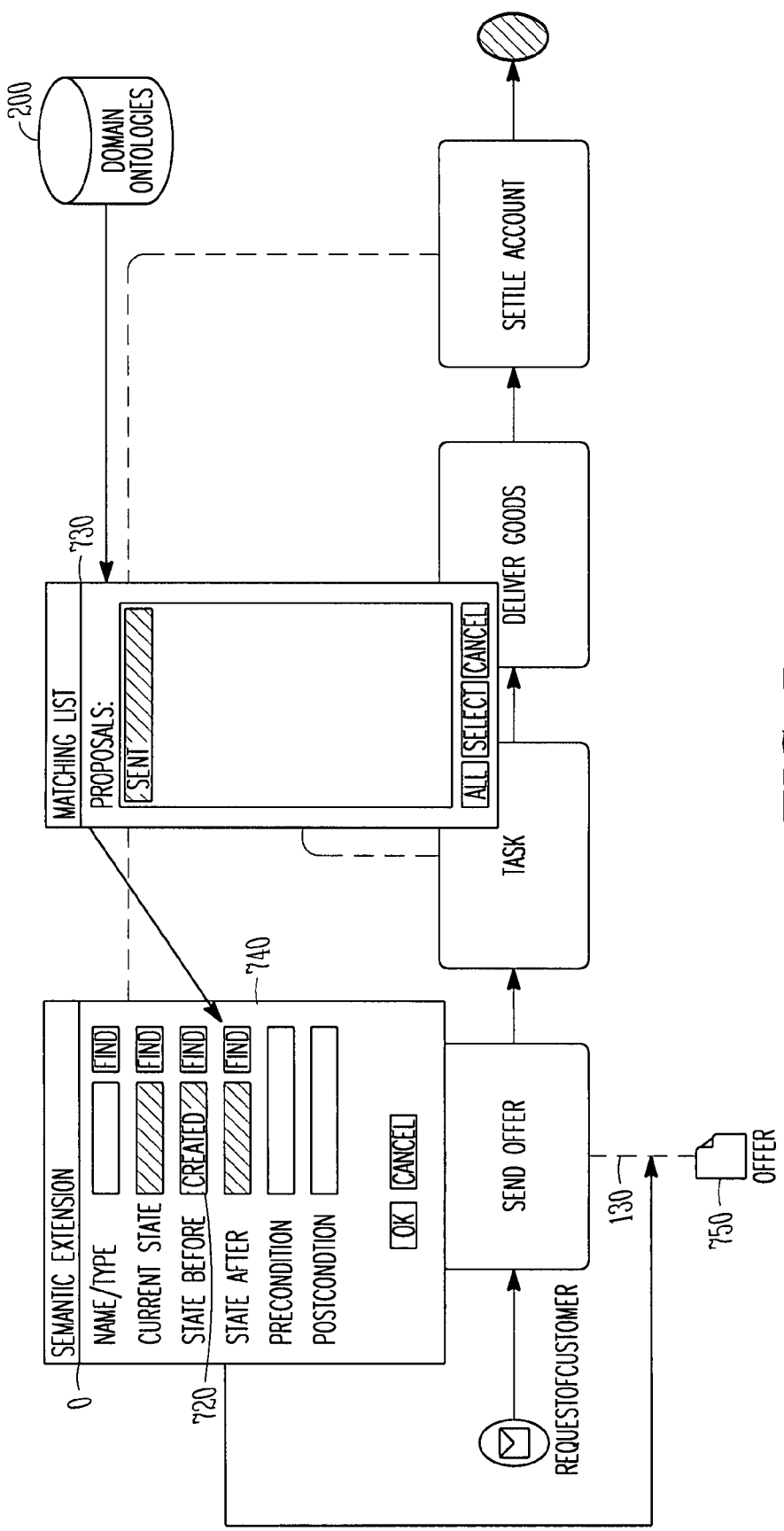
FIG. 7 is a diagram illustrating the specification of states and state transitions of data objects using associations in an example embodiment.

In another example embodiment, once the user selects the domain element, the domain element will be associated with the selected data object in the domain ontology and the definition data object 120 in the business process model will be semantically annotated using the domain element as seen in FIG. 7 (the data object 120 is now specified by type Offer 750).

Association links 130 can also be used for specifying possible states and state transitions for data objects 120. As FIG. 7 illustrates, in one example embodiment, a user wanting to specify an association 130 can select the association 130 which causes a window 710 to appear that supports the user in defining the association 130. The user can use additional discovery functionalities (in this embodiment, triggered by the find button 740) to help the user find appropriate domain element proposals from domain ontologies to describe the association 130. The user can also input text descriptions 720 or any other user indication of states (current, successor, or predecessor states) and state transitions to aid the discovery functionalities in finding appropriate domain element proposals.

Figure 8:
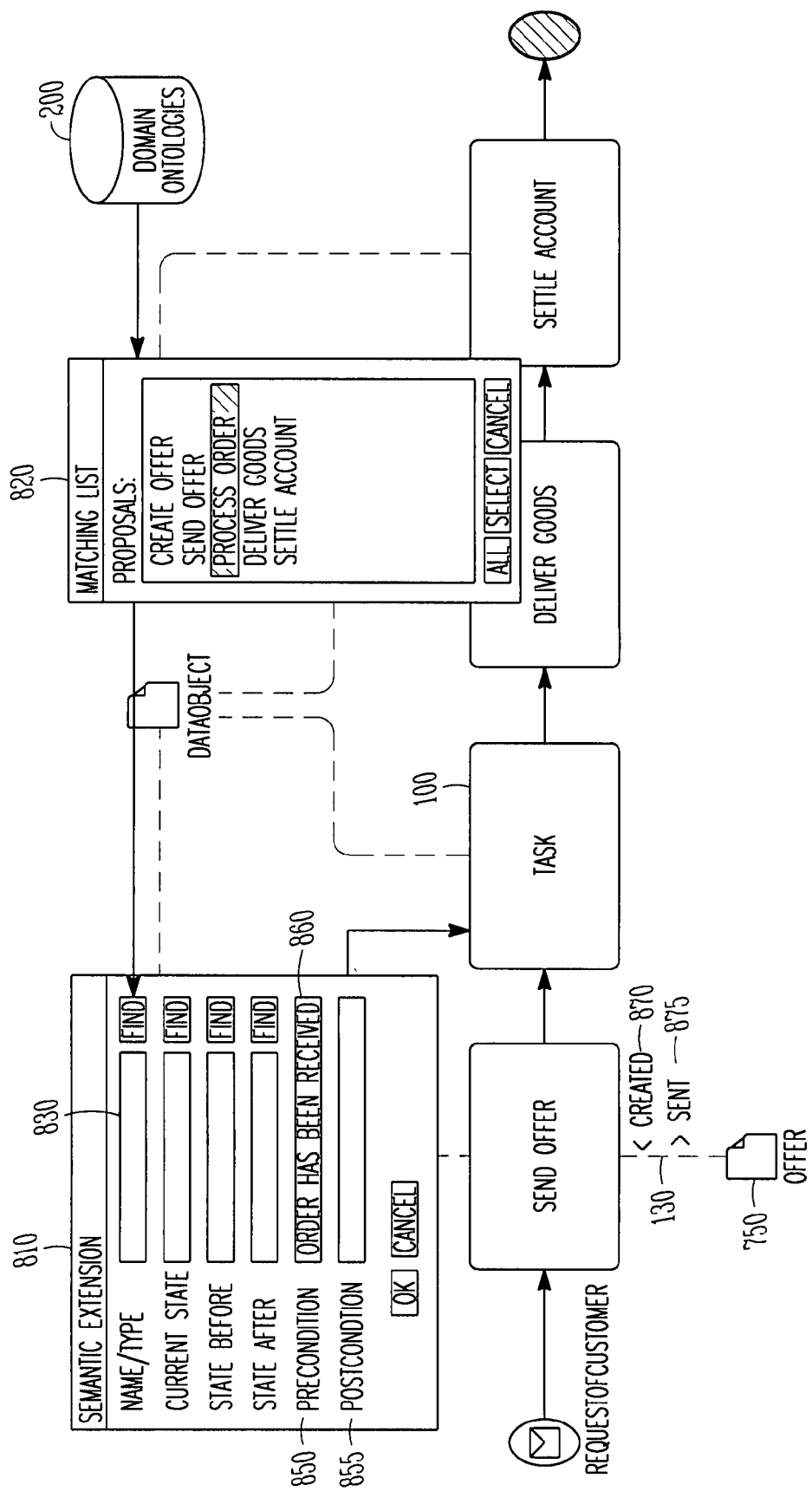
FIG. 8 is a diagram illustrating the specification of a model element in an example embodiment.

Triggering the discovery functionalities opens a new window 730 where the user is presented with a list of domain element proposals from which the user can select the desired domain element. The list of domain element proposals can be automatically generated with the help of a domain ontology 200 describing existing domain model elements such as activities, domain objects and possible states, and with the help of context information provided by the user. The context information may cover user input, such as text, as well as information that can be derived from the neighborhood or relationships within the diagram (e.g. names/type of associated tasks and objects, the relationship between the association 130 and other business process modeling components etc.). In the example illustrated in FIG. 7, the domain element proposal list was generated using the domain ontology 200 information relating to task "send Offer" 310 and data object "Offer" 750 as well as the user input in the text field 720 (State Before is "created"). The user also has the option of indicating the desired domain element from a full list of available domain elements describing the appropriate Association information. If no appropriate object could be found, the user may input the association states and state transitions by typing in text or by any other means. Once selected, the definition of the association link 130 will be semantically annotated using the domain element as seen in FIG. 8 (the association link 130 is now specified by predecessor state created 870 and successor state sent 875).

In still another example embodiment, domain ontologies could support the characterization of business process modeling elements such as those that represent activities or tasks 100. FIG. 8 illustrates an example of this embodiment. As with data objects 120 and associations 130, a user wanting to specify an activity/task 100 modeling element, for example by specifying the business process modeling element type, can select the task 100 which causes a window 810 to appear that supports the user in defining the task 100. The user can use additional discovery functionalities (triggered by the find button 830) to find appropriate descriptions derived from domain ontologies 200 to describe the task 100. The user can also input text descriptions or any other user indication of characteristics such as preconditions and post-conditions to aid the discovery functionalities in finding appropriate domain element proposals.

Triggering the discovery functionalities can open a new window 820 where the user is presented with a list of domain element proposals from which the user can select the desired domain element (such as the desired name/type of the task model element 100). The set of proposals could be filtered with the help of available context information such as user input (in this example, text specifying preconditions 850, 860 or text specifying post-conditions 855 for activities) or information that may be derived from the neighborhood or relationships within the diagram (e.g. associated data objects, etc.). As is the case with previous examples, the user also has the option of indicating the desired domain element from a full list of available domain elements describing the appropriate information and if no appropriate object could be found, the user may input the association states and state transitions by typing in text or by any other means. Once selected, a definition of the task modeling element 100 will be semantically annotated using the domain element.

A BPMN ontology can be utilized as a format for representing semantically augmented BPMN process models. To better capture additional semantic information, the BPMN ontology can be extended to support all elements and attributes needed to augment the process model in the way desired. For example, additional task semantics may provide attributes to capture pre and post conditions for tasks and to make it possible to link BPMN activities/tasks to appropriate elements of domain ontologies describing them. Additional data object semantics may allow the linking of BPMN data objects to corresponding elements of domain ontologies while association semantics may provide possibilities to define states of associated data objects. Finally, an additional state concept could allow the link between state instances, which are used as attribute values in the scope of the associations semantics defined above, to appropriate elements of domain ontologies potentially defining these states.

With these extensions, a BPMN ontology could be used as a format for semantically augmented BPMN process models. Appropriate parsers could be utilized to parse in extended BPMN ontologies, make them available at runtime of BPMN modeling tools, and potentially use them as an internal and external format for representing semantically annotated BPMN process models. While users are modeling business processes by creating, connecting, removing, and modifying various BPMN components within a diagram, instances of the corresponding concepts of an extended BPMN ontology could be set up accordingly. This way, runtime semantic process models could be constructed in extended BPMN ontology format (ontology containing a set of extended BPMN instances) within modeling tools. In order to support the semantic augmentation of the process models in the way proposed, information derived from appropriate domain ontologies may be additionally utilized.

Domain ontologies can be utilized to enable semantic support of modeling activities but are not the only solution; alternative approaches such as finite state machines and Petri nets can also be used. Ontologies are data models representing specific domains. Ontologies generally describe individuals (the basic or "ground level" objects) also known as instances; classes (sets, collections, or types of objects) also known as concepts; attributes (properties, features, characteristics, or parameters of objects) also known as properties; and relations (ways objects can be related to one another).

A domain ontology should provide information about domain objects and states that might help to model business processes more precisely. An example domain ontology contains semantic information that can answer the following questions:

1. What are the objects, states & actions of a business domain and their names?
2. What are possible states of a certain object?
3. What are possible predecessor and successor states of a certain state?
4. Which actions are possibly relevant for a certain object?
5. Which objects are manipulated (state change) by a certain action?
6. Which state changes (transitions) for which objects can be caused by a certain action?

Figure 9:
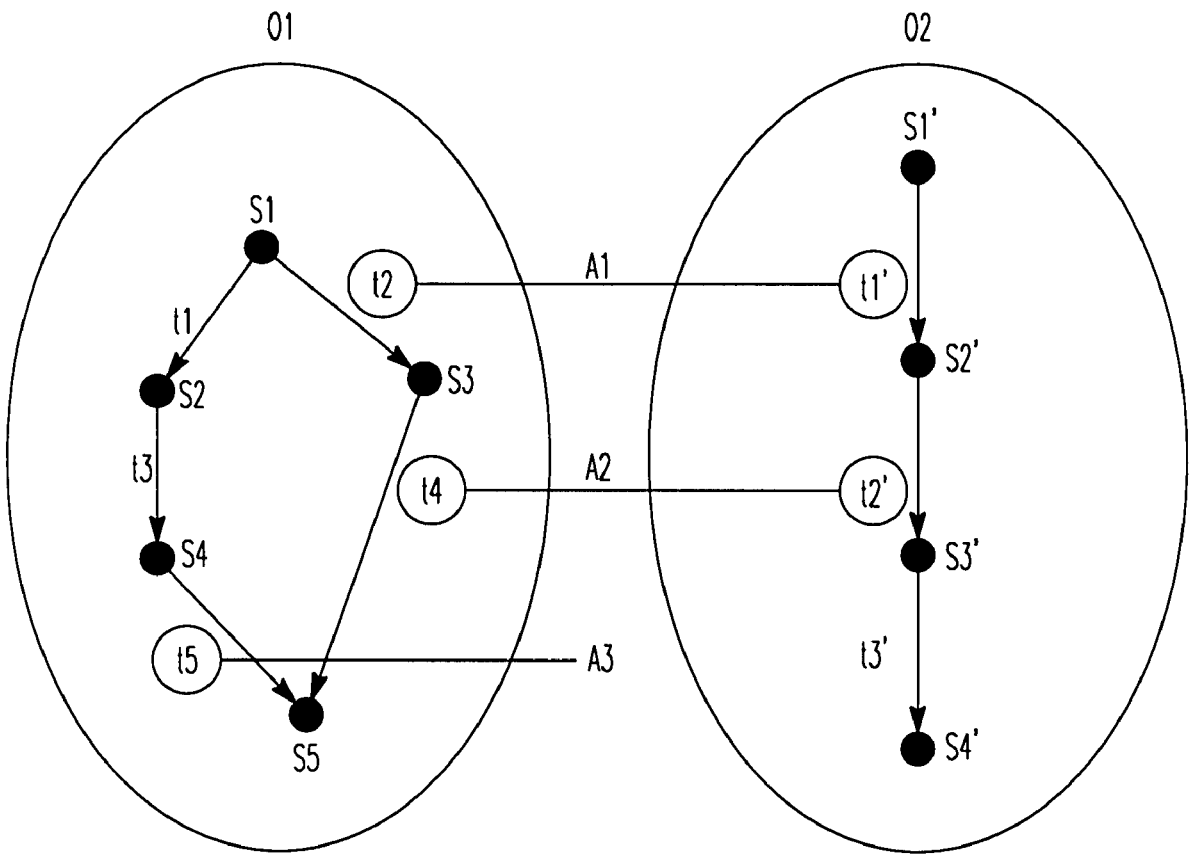
FIG. 9 is a diagram abstractly illustrating the information a domain ontology would provide in an example embodiment.

FIG. 9 abstractly illustrates the information the example domain ontology can provide. The ontology contains information about domain objects, states, transitions, and actions. For each object, possible states and state transitions are described. Actions represent activities in the domain and may cause multiple state transitions regarding different objects.

Figure 10:
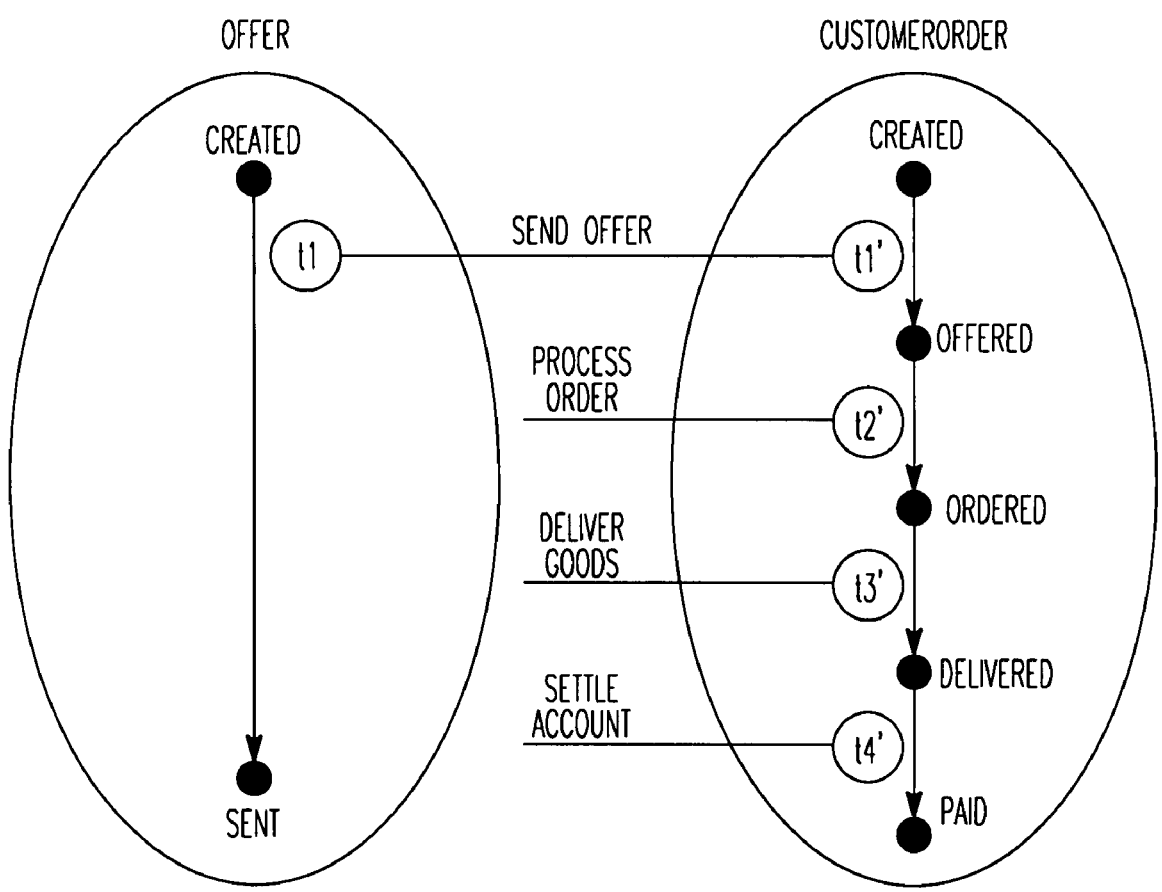
FIG. 10 is a diagram illustrating a simplified example with two objects extracted from an example ontology in an example embodiment.

FIG. 10 shows a simplified and concrete example of an ontology of an example embodiment with two objects. In this example, two states, created and sent, are defined for the domain object Offer. The transition t1 indicates that created is the predecessor state of sent. The transition t1 is triggered by the domain action send Offer, which also causes a state transition t1' from the state created to the state offered for the domain object Customer Order. The remaining states of the object Customer Order are ordered, delivered and paid. The action process Order triggers the transition from offered to ordered, deliver Goods causes the transitions from ordered to delivered, and the action settle Account transfers the object Customer Order from the state delivered to the state paid. Domain ontologies providing this kind of information can be used to support semantic business process modeling because during the modeling activities, domain ontologies can be queried and utilized to help the user specifying model elements and states by proposing appropriate domain concepts or instances.

Another embodiment of the present invention includes matchmaking functionalities. Matchmaking functionalities allow the matching of elements of the graphical business process model with elements of domain ontologies and also support users in semantically specifying their processes by deriving a list of proposal domain elements from domain ontologies given a selected business process modeling component that a user has chosen for specification.

Any number of matching methods can be used either in isolation or in combination with others. Context information such as user input or process diagram "neighborhood information," such as the relationships between components, can also be used. For example, in one embodiment, list generation with the help of textual input can occur using text and name matching methods on user inputs or indications and domain element names. These text matching methods can range from finding exact matches to any of the numerous heuristic comparison methods or well-known string distance metrics.

In an example embodiment, the context of a business process modeling component within the process diagram can be used to explore the domain. A set of domain element proposals may be derived with the help of neighboring elements already specified in the process model and the information covered by the domain ontology. The scope of the context considered can be limitless, or limited, as a compromise between derivation complexity and providing reasonable good sets of proposals. The scope of the context considered can be limited even to the extent of the model component selected by the user and components directly associated to this element. In the following, different scenarios describe how context information may be utilized for matchmaking tasks depending on the type of the element of concern. Data objects, tasks, and associations imply different possible procedures.

Figure 11:
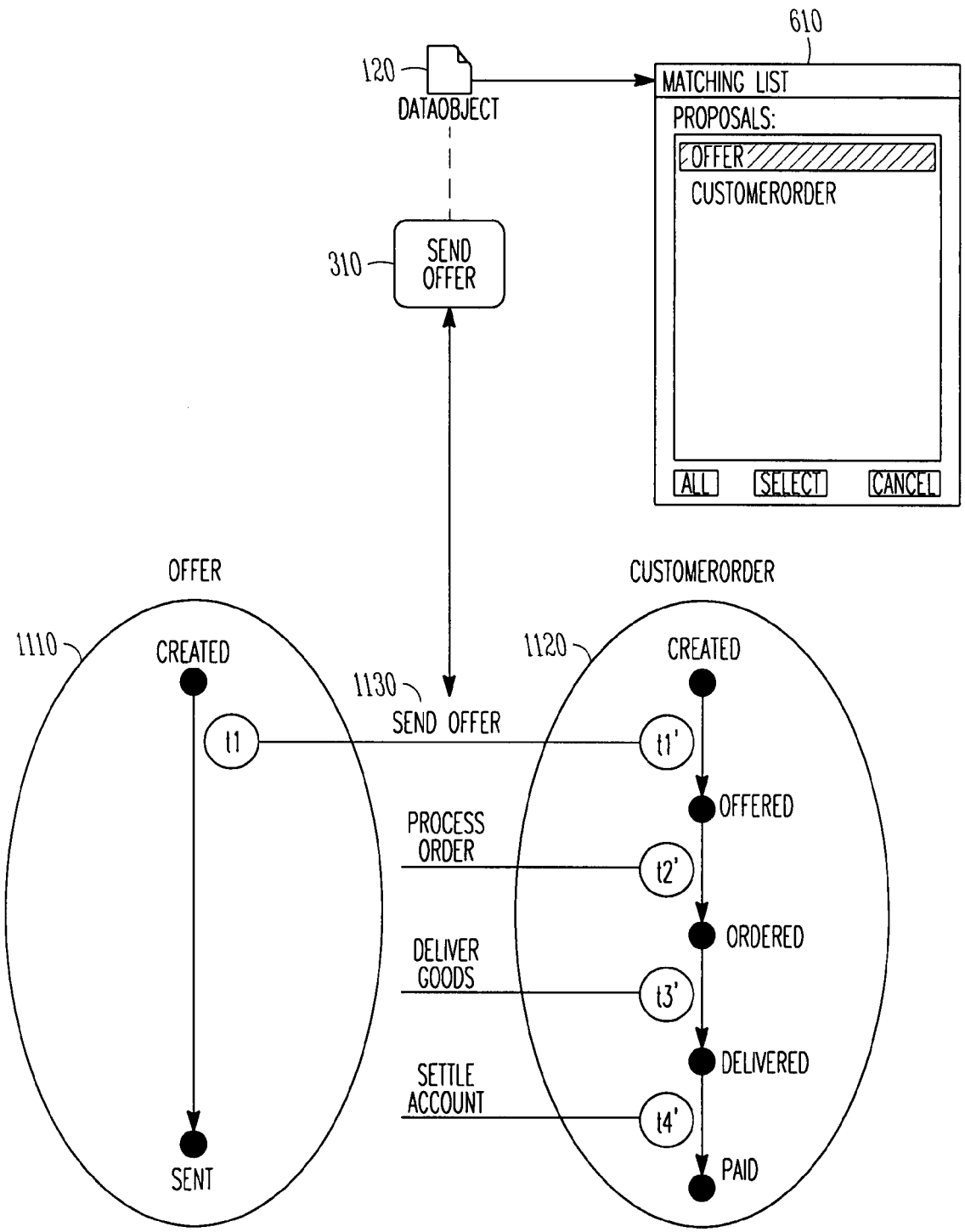
FIG. 11 is a diagram illustrating the defining of a data object using information from the domain ontology in an example embodiment.

FIG. 11 shows an example embodiment where a set of domain element proposals derived with the help of neighboring elements. Here, the user wants to define a data object 120 within this model. The task "send Offer" 310 has been linked to the domain action "send Offer" 1130. This action causes two transitions, one of them affecting the domain object "Offer" 1110, the other one affecting the domain object "Customer Order" 1120. When the user wants to define the data object 120 more precisely, these two domain objects are proposed in the window 610 as possible elements because the data object 120 is associated to the task "send Offer" 310. The user has not typed in a potential name for the data object 120, this is why the set of proposals listed in the window 610 is not additionally filtered and both domain objects are selectable. In another example embodiment, if the task "send Offer" 310 was not linked to the domain action "send Offer" 1130, the list of proposals would only contain the domain object "Offer" 1110, which can be found via name/text matching with "send Offer."

Figure 12:
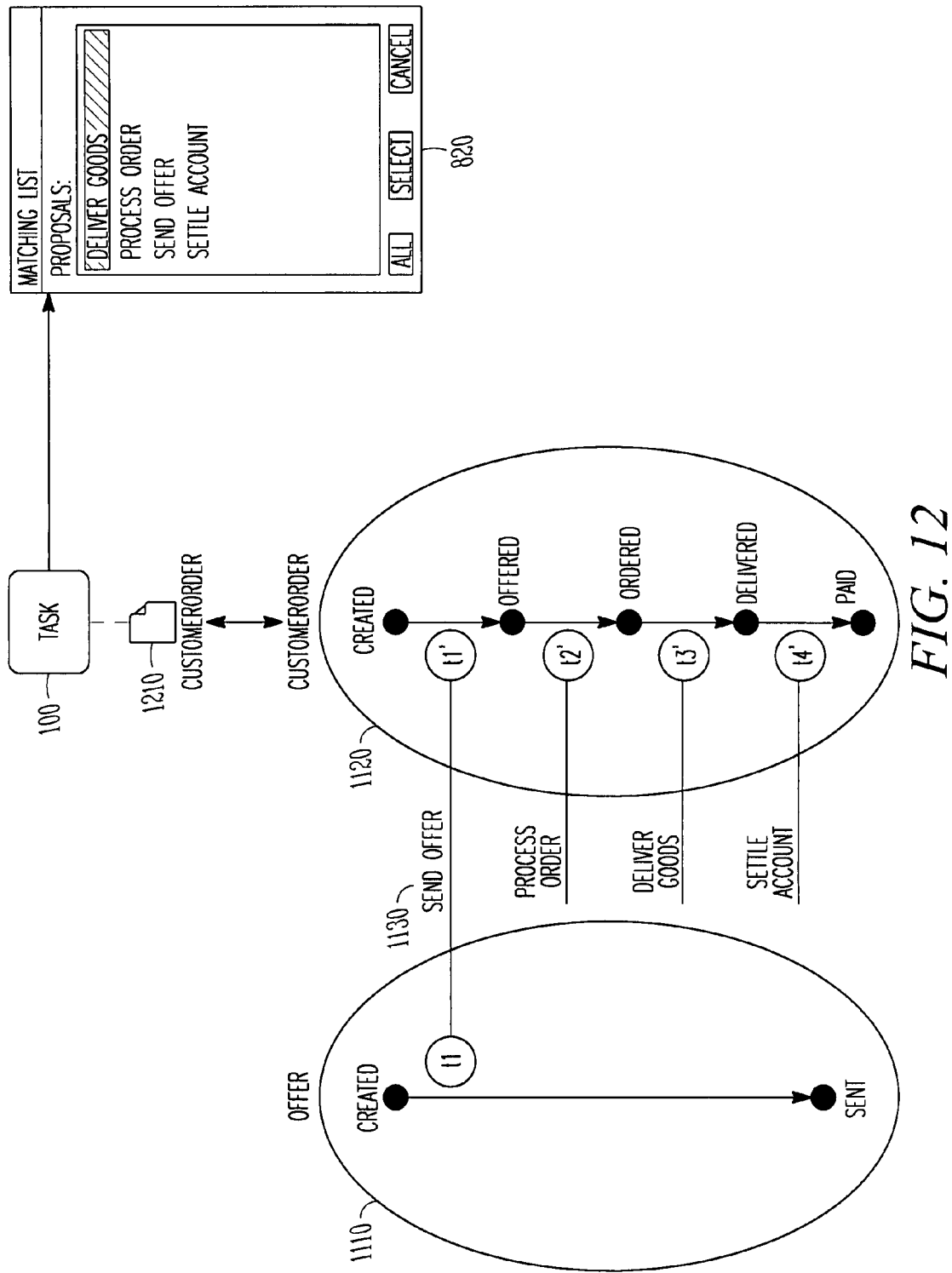
FIG. 12 is a diagram illustrating the defining of a model element using information from the domain ontology in an example embodiment.

In an example embodiment, a user can also define a task 100 (represented by a modeling element). FIG. 12 illustrates this example. The data object "Customer Order" 1210 has been linked to the domain object "Customer Order" 1120. This object is affected by the four domain actions "deliver Goods", "process Order", "send Offer", and "settle Account". When a user wants to specify the task 100, these four actions are proposed as possible elements in the window 820 because the task 100 is associated to the data object "Customer Order" 1210. In this case the user has not typed in a potential name for the task 100 so the set of proposals is not additionally filtered and all of the four domain objects are selectable. In another example embodiment, if the data object "Customer Order" 1210 was not linked to the domain object "Customer Order" 1120, the list of proposals would only contain the domain action "process Order," which can be found via name matching with "Customer Order".

Figure 13:
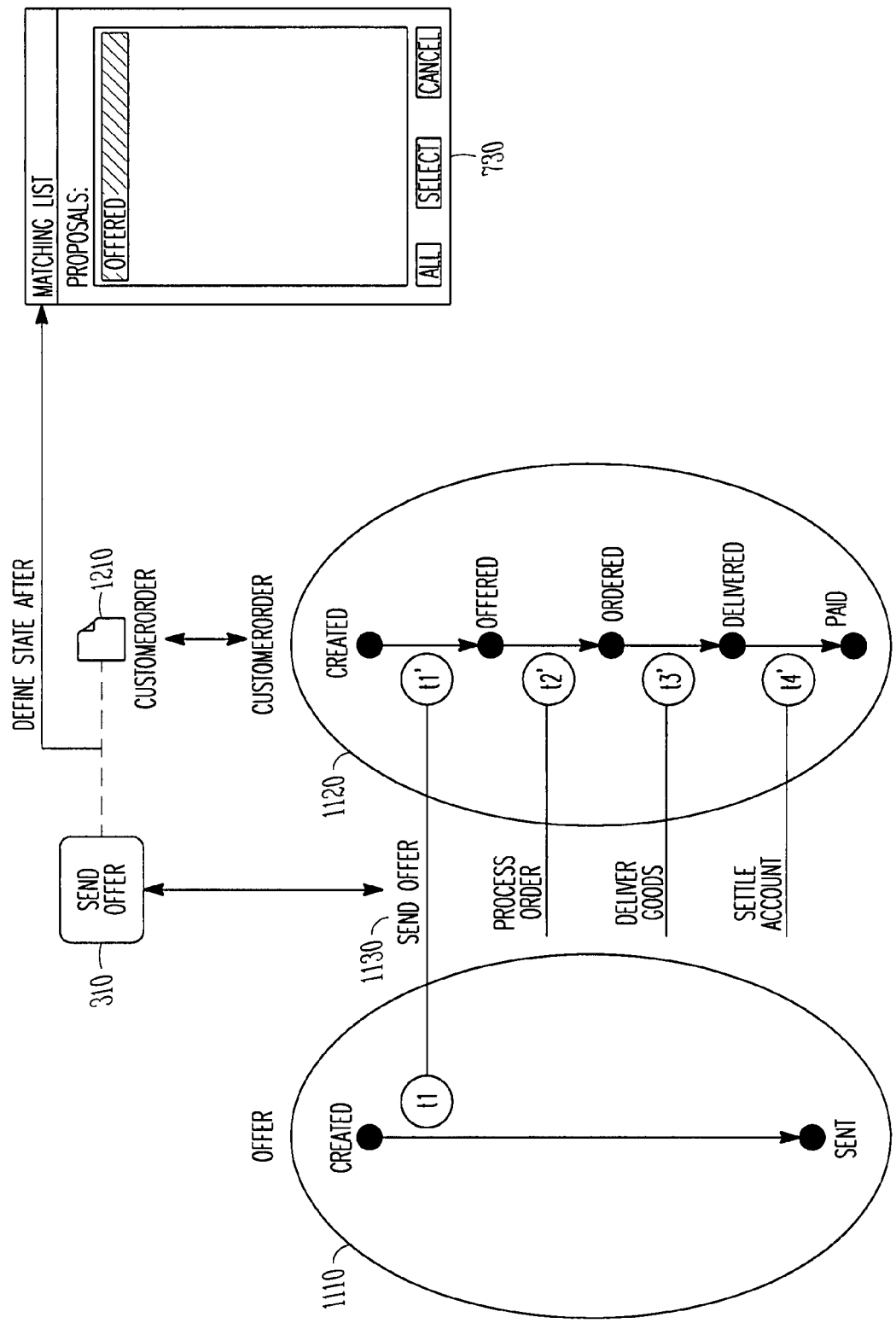
FIG. 13 is a diagram illustrating the defining of states of a data object on an association using information from the domain ontology in an example embodiment.

In another example embodiment, as FIG. 13 illustrates, a user can define states of a data object on an association link. The task "send Offer" 310 has been linked to the domain action "send Offer" 1130. This action causes two transitions, one of them affecting the domain object "Offer" 1110, the other one affecting the domain object "Customer Order" 1120. The data object "Customer Order" 1210 has been linked to the domain object "Customer Order" 1120. With this information, the domain transition of concern (t1') can be identified. When the user wants to define the state of the data object "Customer Order" 1210 after the task "send Offer" 310 has been carried out, the domain state "offered" is proposed because it is the state after the transition of concern. In another example embodiment, if the data object "Customer Order" 1210 is not linked to the domain object "Customer Order" 1120, the list of proposals would contain the domain states "sent" and "offered," which can be found via the domain action "send Offer" 1130.

The embodiments described disclose how context information is utilized to support the semantic modeling of business processes and are in no way restrictive. In another embodiment, the scope of the context information to be considered may be further extended beyond the local scope described in the above embodiments, even though the local scope used in the embodiments above allow for deriving reasonable good sets of proposals. By extending the scope of the context information considered beyond the immediate neighborhood (i.e., beyond the range of the model component selected by the user and components directly associated to this component), the user gains additional matchmaking abilities, some of which are illustrated below.

Figure 14:
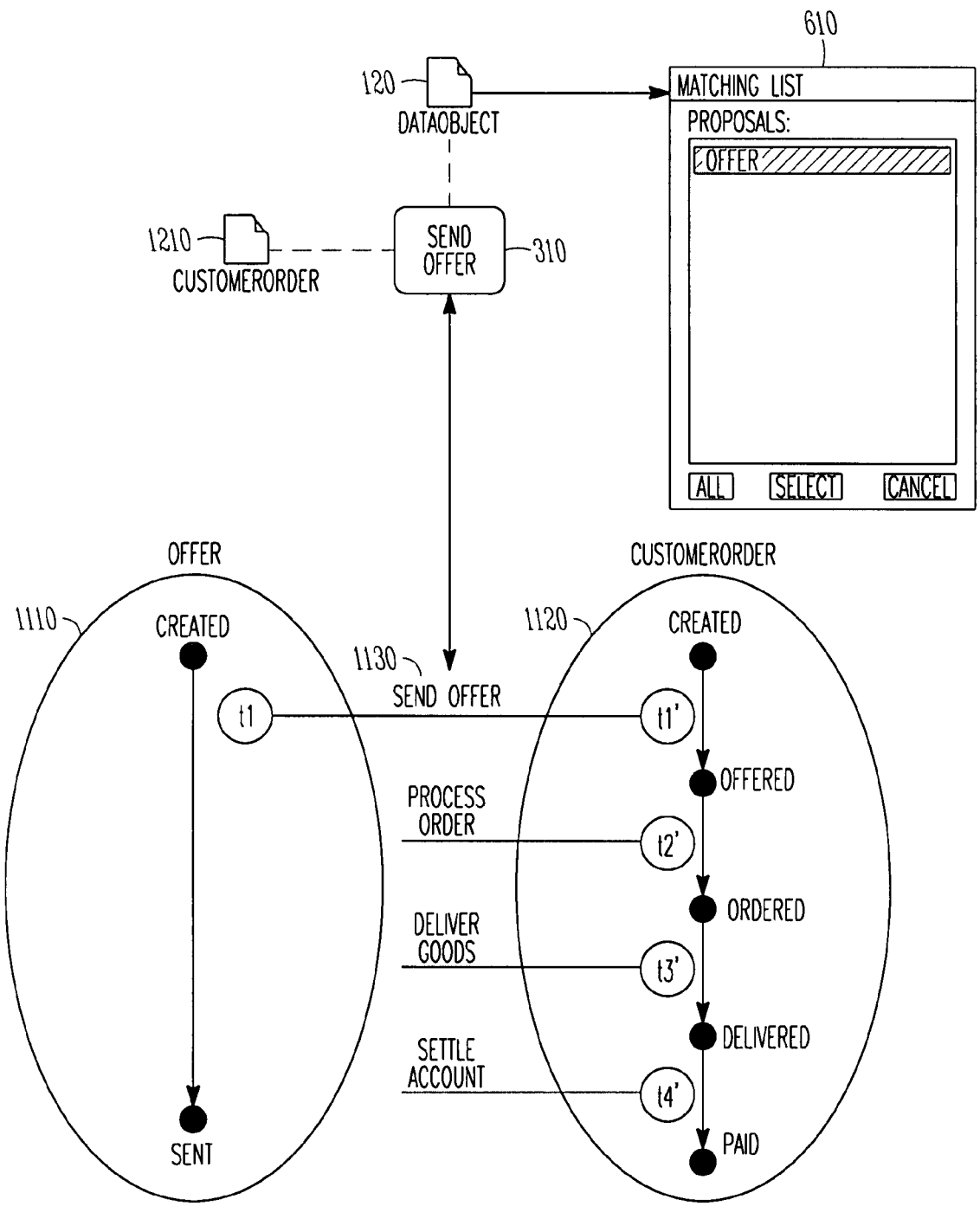
FIG. 14 is a diagram illustrating the defining of a data object using information from the domain ontology and context information in an example embodiment.

In an example embodiment, as illustrated by FIG. 14, a user can specify a data object 120 associated to the task "send Offer" 310, which has been linked to the domain action "send Offer" 1130. Normally, there are two proposal candidates for the data object 120, namely the domain objects "Offer" 1110 and "Customer Order" 1120, but considering a larger scope of context, the object "Customer Order" 1210, which has already been linked to the same task can be recognized and the proposal list can be filtered accordingly. Therefore, only the object "Offer" is proposed to the user.

Figure 15:
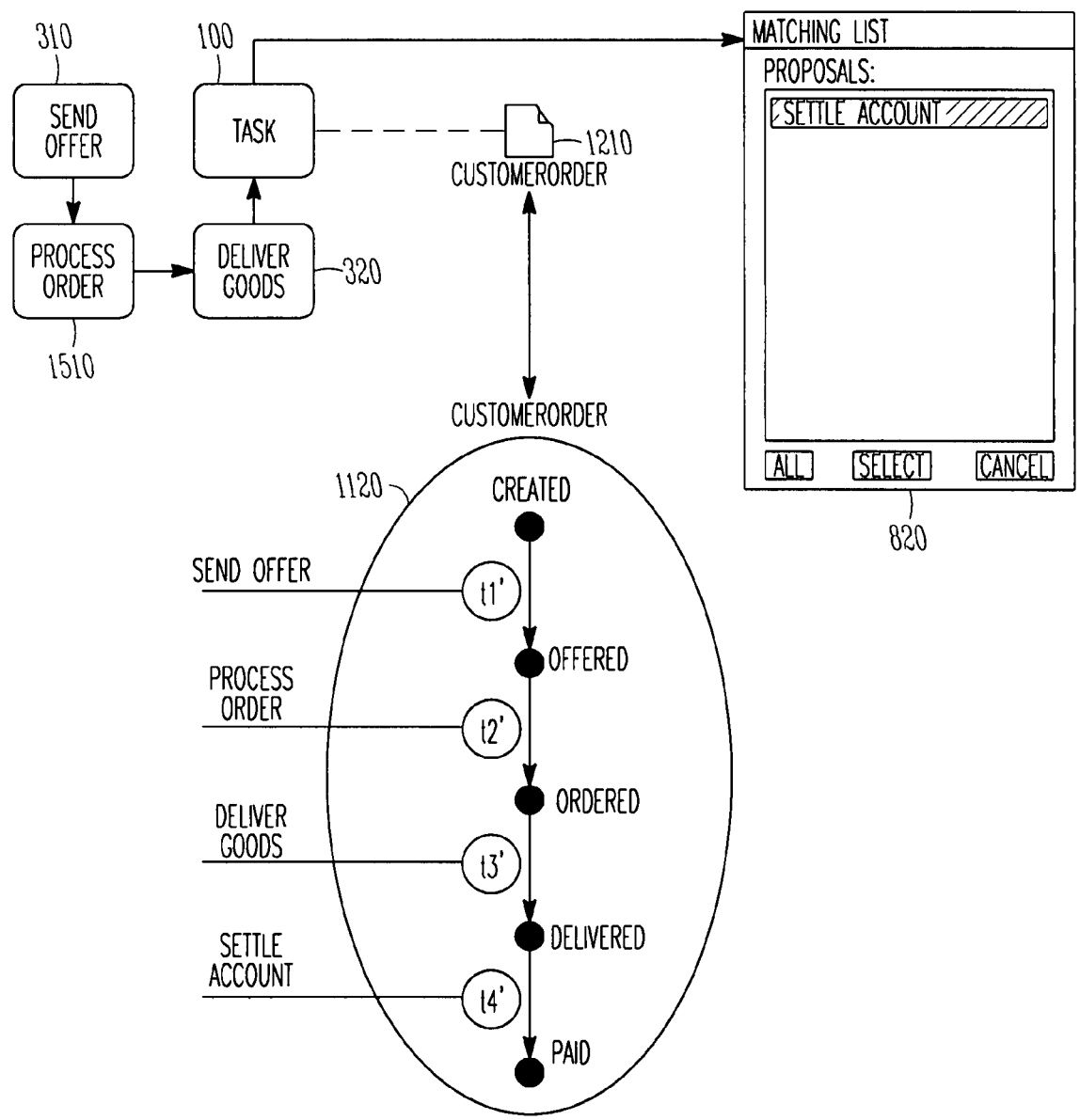
FIG. 15 is a diagram illustrating the defining of a model element using information from the domain ontology and context information in an example embodiment.

Tasks can also be defined by considering control flow connections to other tasks. FIG. 15 illustrates an example embodiment that includes this feature. Without considering control flows, the list of proposals for the task to be defined in this example would contain all domain actions described for the object "Customer Order". Following the control flows to other tasks, the candidates "deliver Goods", "process Order", and "send Offer" could be eliminated from the list and the domain action "settle Account" remains.

Figure 16:
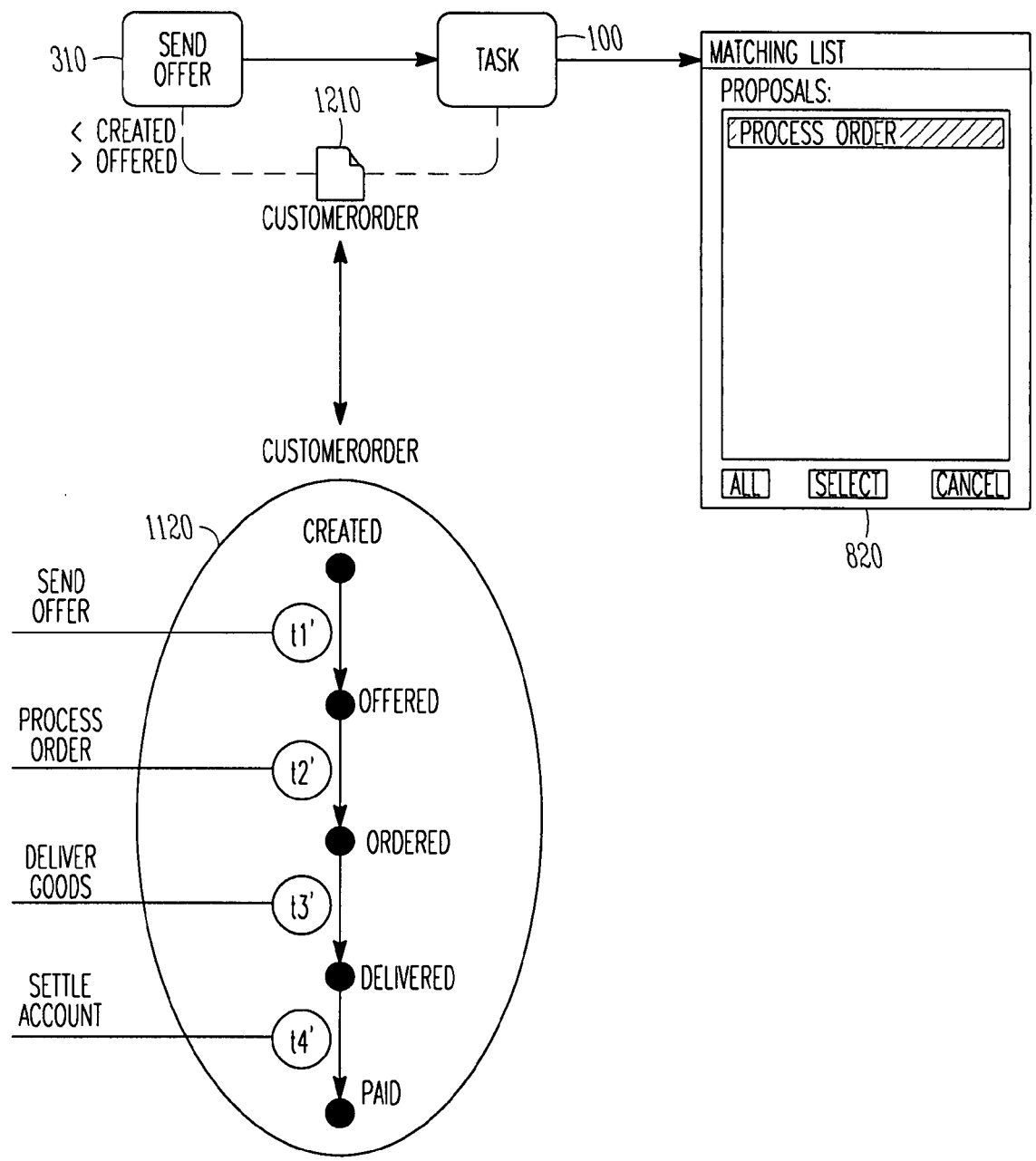
FIG. 16 is another diagram illustrating the defining of a model element using information from the domain ontology and context information in an example embodiment.

Another example embodiment, illustrated in FIG. 16, shows another option to define a task. In FIG. 16, the data object, "Customer Order" 1210, which is associated to the task 100 that the user has chosen to define, is also associated to the preceding task "send Offer" 310. Based on the information about the state of the data object 1210 after the previous task ("offered" in this example), all domain actions concerning the object "Customer Order", which trigger transitions from the state "offered" to another state of the object can be proposed to the user for defining the chosen task 100. In this example, there is only one possible transition starting from "offered." This transition is triggered by the domain action "process Order," which is included in the list of proposals.

Figure 17:
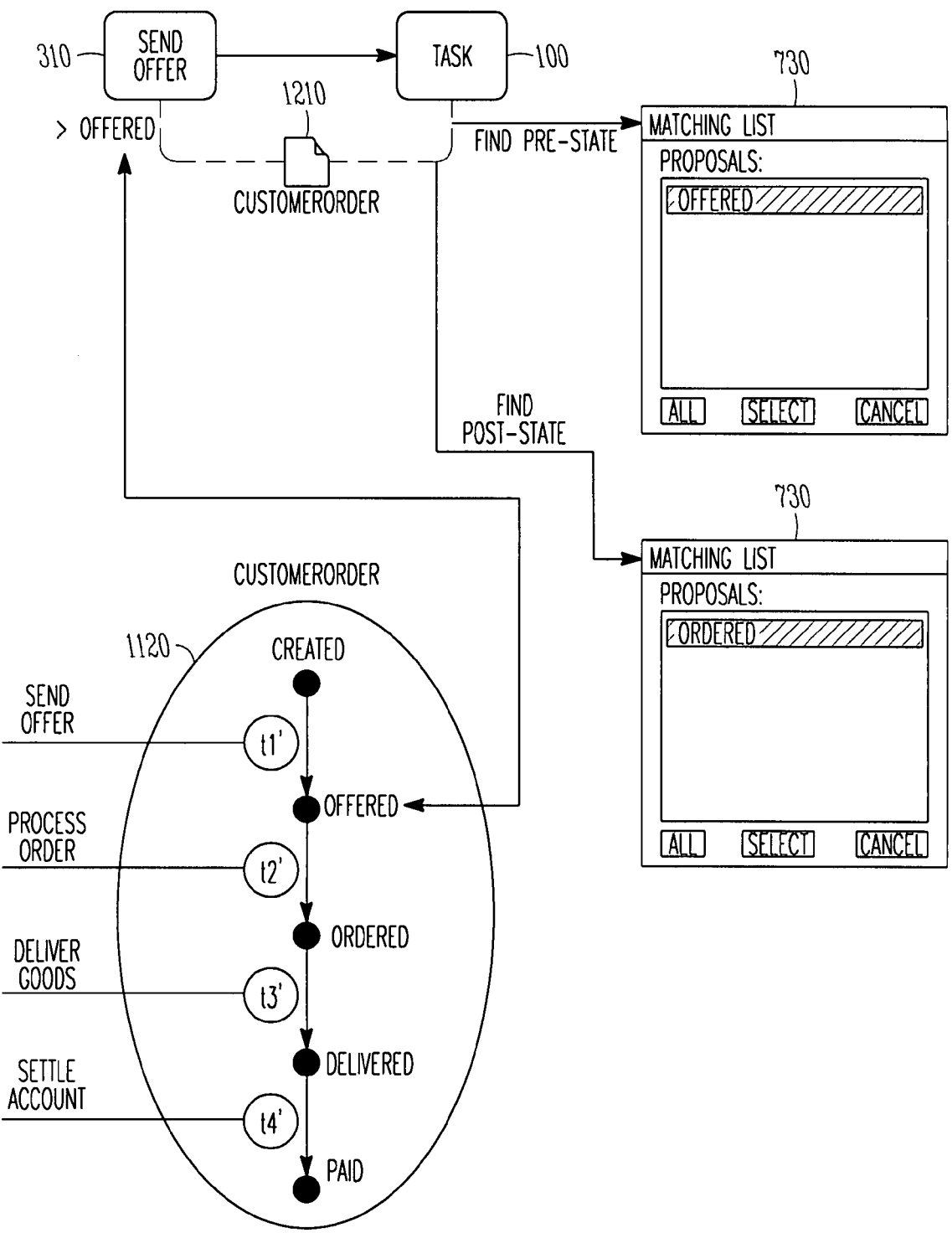
FIG. 17 is a diagram illustrating the defining of states of a data object on an association using information from the domain ontology and context information in an example embodiment.

The states of a data object can be similarly defined by considering previously defined states as well. If the same data object is associated to multiple activities, the states of this data object defined in the context of one task may help to propose possible states in the context of another task. This possible feature is exemplified in FIG. 17. In this case, the state "offered" of the data object "Customer Order" 1210 after the task "send Offer" 310 may be proposed as the state of "Customer Order" 1210 before the next task 100. In the same way, possible successor states of "offered" ("ordered," "delivered," and "paid" in this example) can be proposed as states for subsequent activities.

The semantic extension of business process modeling tools can realized by using an annotation module that receives a definition of a business process modeling component (such as data objects 120, model elements (such as tasks 100), associations 130, etc.) from a business process model (BPMN) 210 and annotates it with a domain element received from the domain ontology.

In another embodiment, the semantic annotation of business process model is aided by an interface module that presents one or more suggested domain elements to a user, the user can then select the desired domain element. Once selected, the selected domain element is received by the annotation module to semantically annotate the business process modeling component with. The one or more suggested domain elements that are presented by the interface module can be identified automatically by the interface module using information from the domain ontology 200 and context information. Domain ontology information can include among other things: objects, states, transitions, actions, and their relationships among one another. Context information may include user input or indications, such as text, as well as information that can be derived from "neighborhood information" within the diagram (the proximity or number of association links between components) or other relationships between different business process modeling components as shown in the diagram. These sources of information and examples of their use have been discussed above.

Figure 18:
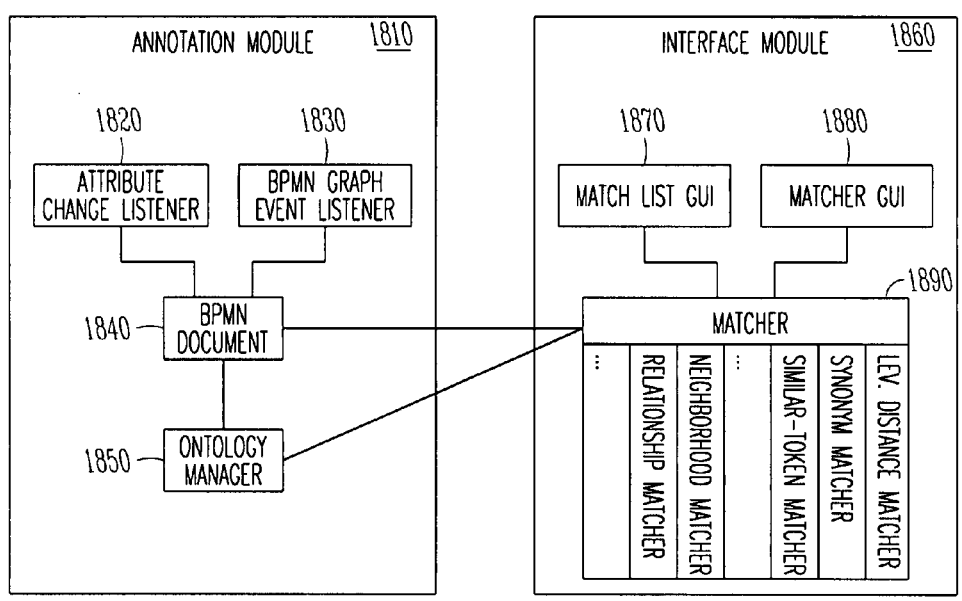
FIG. 18 is a block diagram illustrating an annotation module and an interface module in an example embodiment.

FIG. 18 illustrates a detailed example of one possible implementation of the above embodiment. A possible configuration of the annotation module 1810 consists of a BPMN document 1840, an attribute change listener 1820, a BPMN graph change listener 1830, and an ontology manager 1850. In the tool, business process diagrams are embedded in these so-called BPMN Documents 1840. The Ontology Manager 1850 implements functionalities to import (parse in) and export (store) ontology files. Different event listeners listen for changes within the process diagram and are utilized to update the BPMN process model accordingly. If a user adds or removes elements in the process diagram, BPMN graph event listeners 1830 create or remove the corresponding instances in the BPMN process model. For each element in the process diagram, attribute change listeners 1820 take care of updating the appropriate instance attributes and their values within the BPMN process model.

The BPMN process models do not necessarily have to cover any layout information as this information usually is modeling tool specific and not essential regarding the realization lifecycle of process models. However, such layout information may, for instance, be useful for later changes and modifications of the business process models. Therefore, besides the BPMN process model an additional visual model, which contains layout information, can also be maintained. These two models can be kept consistent by means of event listeners.

A possible configuration of the interface module 1860 consists of a match list GUI 1870, a matcher GUI 1880, and a matcher 1890. If a user wants to specify a model element, a matcher GUI window opens up, which allows for user input and controls the matcher 1890. The matcher 1890 can implement some heuristic text-based matchmaking methods, as well as context-based matching functionalities like those described above. The matcher 1890 supports the user by automatically identifying and providing domain element proposals for the model component to be specified derived with the help of an ontology describing the related domain and context information. For this purpose the matcher can also use multiple additional matchers. Some possible matches include: a "Levenshtein distance matcher," which allows for fault tolerant name matching based on the Levenshtein distance; a "synonym matcher," which supports the consideration of synonyms and homonyms of the names typed in by the user for matchmaking by accessing dictionaries; and a "similar-token matcher," which enables matchmaking based on similar tokens. Matchers that find domain element proposals based on "neighborhood information" and the information regarding the relationships between modeling components, as described above, can also be used. All matchers and matching approaches can be integrated and combined with the matcher 1890. The domain element proposals found by the matcher 1890 can be sorted based on their matching scores, alphabetically, or other method and are displayed in a match list GUI window, which allows the user to select one element from the suggested list or to query the whole domain ontology manually. After matchmaking is done, the matcher 1890 updates the BPMN document 1840 if necessary. This way, process model components can be mapped and linked to elements of the domain ontology 200.

By exploiting domain ontologies to define possible model elements, the terminology used within these models becomes more formalized and less arbitrary. By additionally using appropriate matchmaking functionalities, which can be configured to resolve possible synonymic and homonymic aberrations, the present invention can help to realize shared terminologies and a common language for modeling, avoiding the communication problems arising from terminological diversities. The resulting process models are more tightly coupled to formalized domain descriptions, which is a first step towards enabling further machine reasoning tasks.

The resulting augmented process models may be used to enhance querying the process space, e.g. by answering questions regarding which objects are manipulated within which business process models. If, for example, a new law is enacted concerning the date of expiry of dairy products, the augmented process models and the knowledge of the domain ontologies can help to find out which business processes are affected by the new law. Depending on the detail and expressiveness of the domain ontologies used, additional reasoning tools may exploit the potentials of ontological descriptions, like manifold relationships or axioms, for querying the process space more exhaustively. The initial domain ontology example may serve as a basis for further integration of semantic information that may be utilized.

CONCLUSION

A number of examples of embodiments of the invention are set forth below,

The inventors have recognized that modeling tools for business processes may be augmented with functionalities to support users in providing additional information beyond the usual graphical layout world. This is done by semantically annotating business process models. In other words, graphical representations of business process models need to be infused (semantically annotated) with information beyond the information provided by the graphical layout. Semantic pieces of information may then contribute to couple process models closer to specific domains, to facilitate the realization of process models, and to ease querying the set of business processes in an enterprise, e.g. by answering questions regarding which objects are manipulated within which business process models. The semantic annotation of business process models can be realized in a separate standalone tool or be integrated into a graphical business process modeling tool as discussed in the examples below. For clarity, the embodiments below focus on a limited set of business process modeling components: data objects, associations, and modeling elements (modeling elements representing activities/ tasks in particular). It will be evident to one skilled in the art, however, that other types of modeling elements and modeling components can be extended and specified in the same way as those described below.

Example 1 describes a method comprising: receiving a definition of a business process modeling component of a business process model; receiving an association of a domain element with the business process modeling component, the domain element being included in a domain ontology; and semantically annotating the definition of the business process modeling component using the domain element.

In Example 2, the method of Example 1 optionally comprises presenting the domain element to a user, and wherein receiving the association of the domain element with the business process modeling component includes receiving a user indication of the association of the domain element with the business process modeling component.

In Example 3, the method of Example 2 optionally comprises a method wherein presenting the domain element includes automatically identifying a plurality of domain elements to present to the user using the domain ontology, In Example 4, the method of Example 3 optionally comprises a method wherein automatically identifying the plurality of domain elements includes identifying a plurality of domain elements using context information In Example 5, the method of Example 4 optionally comprises a method wherein identifying the plurality of domain elements using context information includes identifying a plurality of domain elements using information about the relationships between business process modeling components In Example 6, the method of Example 4 optionally comprises a method wherein identifying the plurality of domain elements using context information includes identifying a plurality of domain elements using input from the user.

In Example 7, the method of Example 6 optionally comprises a method wherein receiving the definition of the business process modeling component includes receiving a definition of a business process modeling element of the business process model.

In Example 8, the method of any one or more of Examples 1-7 optionally comprises a method wherein receiving the association of a domain element with the business process modeling component includes receiving an association of a business process modeling element type with a business process modeling element.

In Example 9, the method of Example 8 also optionally comprises presenting the domain element to the user, and wherein receiving the association of the domain element with the business process modeling component includes receiving a user indication of the association of the domain element with the business process modeling element.

In Example 10, the method of Example 9 also optionally comprises a method wherein presenting the domain element includes automatically identifying a plurality of domain elements to present to the user using the domain ontology.

In Example 11, the method of Example 10 also optionally comprises a method wherein automatically identifying the plurality of domain elements to present to the user includes identifying a plurality of domain elements using context information.

In Example 12, the method of Example 11 also optionally comprises a method wherein identifying the plurality of domain elements using context information includes identifying a plurality of domain elements using at least one of a precondition, a post-condition, or a combination thereof.

In Example 13, the method of Example 11 also optionally comprises a method wherein identifying the plurality of domain elements using context information includes identifying a plurality of domain elements using information about the relationships between the business process modeling element and other business process modeling components.

In Example 14, the method of Example 13 also optionally comprises a method wherein identifying the plurality of domain elements using information about the relationships between the business process modeling element and other business process modeling components includes identifying the plurality of domain elements using information about the state of a data object associated to the business process modeling element.

In Example 15, the method of Example 13 also optionally comprises a method wherein identifying the plurality of domain elements using information about the relationships between the business process modeling element and other business process modeling components includes identifying the plurality of domain elements using information about the control flow connections to other modeling elements.

In Example 16, the method of Example 11 also optionally comprises a method wherein identifying the plurality of domain elements using context information includes identifying a plurality of domain elements using input from the user.

In Example 17, the method of any one or more of Examples 1-16 also optionally comprises a method wherein receiving the definition of the business process modeling component includes receiving a definition of a data object of the business process model.

In Example 18, the method of any one or more of Examples 1-17 also optionally comprises a method wherein receiving the association of a domain element with the business process modeling component includes receiving an association of a data object type with a data object.

In Example 19, the method of any one or more of Examples 1-17 also optionally comprises a method wherein receiving the association of the domain element with the business process modeling component includes receiving a user indication of the association of the domain element with the data object; and also including presenting the domain element to the user.

In Example 20, the method of Example 19 also optionally comprises a method elements to present to the user using the domain ontology.

In Example 21, the method of Example 20 also optionally comprises a method wherein automatically identifying the plurality of domain elements to present to the user includes identifying a plurality of domain elements using context information.

In Example 22, the method of Example 21 also optionally comprises a method wherein identifying the plurality of domain elements using context information includes identifying a plurality of domain elements using information about the relationships between the data object and other business process modeling components.

In Example 23, the method of Example 22 also optionally comprises a method wherein identifying the plurality of domain elements using information about the relationships between the data object and other business process modeling components includes identifying the plurality of domain elements using information about another associated data object of the business process modeling element associated to the data object.

In Example 24, the method of Example 21 also optionally comprises a method wherein identifying the plurality of domain elements using context information includes identifying a plurality of domain elements using input from the user.

In Example 25, the method of any one or more of Examples 1-24 also optionally comprises a method wherein receiving the definition of the business process modeling component includes receiving a definition of an association between a data object and a modeling element of the business process model.

In Example 26, the method of any one or more of Examples 1-25 also optionally comprises a method wherein receiving the association of a domain element with the business process modeling component includes receiving an association of a current state of a data object, a predecessor state of a data object, a successor state of a data object, or a combination thereof, with an association between a data object and a modeling element of the business process model.

In Example 27, the method of any one or more of Examples 1-26 also optionally includes a method also including presenting the domain element to the user, and wherein the receiving of the association of the domain element with the business process modeling component includes receiving a user indication of the association of the domain element with the association between a data object and a business process modeling element.

In Example 28, the method of Example 27, also optionally comprises a method wherein presenting of the domain element includes automatically identifying a plurality of domain elements to present to the user using the domain ontology.

In Example 29, the method of Example 28 also optionally comprises a method wherein automatically identifying the plurality of domain elements to present to the user includes identifying a plurality of domain elements using context information.

In Example 30, the method of Example 29 also optionally comprises a method wherein the identifying the plurality of domain elements using context information includes identifying a plurality of domain elements using information about the relationships between the association between a data object and a modeling element and other business process modeling components.

In Example 31, the method of Example 30 also optionally comprises a method wherein identifying the plurality of domain elements using information about the relationships between the association between a data object and a modeling element and other business process modeling components includes identifying the plurality of domain elements using information about previously defined states of the data object that the association links with the modeling element.

In Example 32, the method of Example 29 also optionally comprises a method wherein identifying the plurality of domain elements using context information includes identifying a plurality of domain elements using input from the user.

Example 33 describes a system comprising an annotation module to receive a definition of a business process modeling component and an association of a domain element with a business process modeling component, the domain element being included in a domain ontology; and semantically annotate the business process modeling component using the domain element.

In Example 34, the system of Example 33 optionally further comprises: an interface module to present the domain element to a user; and wherein the annotation module is to receive user indication of the association of the domain element with the business process modeling component.

In Example 35, the system of any one or more of Examples 33-34 optionally comprises a system wherein the interface module, in presenting the domain element to a user, is to automatically identify a plurality of domain elements using the domain ontology.

In Example 36, the system of any one or more of Examples 33-35 optionally comprises a system wherein the interface module is to identify a plurality of domain elements using context information.

In Example 37, the system of Example 36 optionally comprises a system wherein the context information includes information about the relationships between business process modeling components.

In Example 38, the system of any one or more of any one or more of Examples 35 or 36 optionally comprises a system wherein the context information includes input from the user.

In Example 39, the system of any one or more of Examples 33-38 optionally comprises a system wherein the annotation module, in receiving the definition of the business process modeling component, is to receive a definition of a business process modeling element of a business process model.

In Example 40, the system of any one or more of Examples 33-39, optionally comprises a system wherein the annotation module, in receiving the association of a domain element with a business process modeling component, is to receive an association of a business process modeling element type with a business process modeling element.

In Example 41, the system of Example 39 optionally further comprising: an interface module to present the domain element to a user; and wherein the annotation module, in receiving the association of the domain element with the business process modeling component, is to receive a user indication of the association of the domain element with the business process modeling element.

In Example 42, the system of Example 41 optionally comprises a system wherein the interface module, in presenting the domain element to a user, is to automatically identify a plurality of domain elements using the domain ontology.

In Example 43, the system of any one or more of Examples 41 or 42 optionally comprises a system wherein the interface module, in automatically identifying a plurality of domain elements, is to identify a plurality of domain elements using context information.

In Example 44, the system of any one or more of Examples 41-43 optionally comprises a system wherein the interface module, in identifying the plurality of domain elements using context information, is to identify a plurality of domain elements using at least one of a precondition, a post-condition, or a combination thereof.

In Example 45, the system of any one or more of Examples 41-44 optionally comprises a system wherein the interface module, in identifying the plurality of domain elements using context information, is to identify a plurality of domain elements using information about the relationships between the business process modeling element and other business process modeling components.

In Example 46, the system of any one or more of Examples 41-45 optionally comprises a system wherein the interface module, in identifying the plurality of domain elements using information about the relationships between the business process modeling element and other business process modeling components, is to identify a plurality of domain elements using information about the state of a data object associated to the business process modeling element.

In Example 47, the system of any one or more of Examples 41-45 optionally comprises a system wherein the interface module, in identifying the plurality of domain elements using information about the relationships between the business process modeling element and other business process modeling components, is to identify a plurality of domain elements using information about the control flow connections to other modeling elements.

In Example 48, the system of any one or more of Examples 41-43 optionally comprises a system wherein the interface module, in identifying the plurality of domain elements using context information, is to identify a plurality of domain elements using input from the user.

In Example 49, the system of any one or more of Examples 33-48 optionally comprises a system wherein the annotation module, in receiving the definition of the business process modeling component, is to receive a definition of a data object of a business process model.

In Example 50, the system of any one or more of Examples 43-49 optionally comprises a system wherein the annotation module, in receiving the association of the domain element with the business process modeling component, is to receive an association of a data object type with a data object.

In Example 51, the system of any one or more of Examples 33-49 optionally further comprising: an interface module to present the domain element to a user; and wherein the annotation module, in receiving the association of the domain element with the business process modeling component, is to receive a user indication of the association of the domain element with the data object.

In Example 52, the system of Example 51 optionally comprises a system wherein the interface module, in presenting the domain element to a user, is to automatically identify a plurality of domain elements using the domain ontology.

In Example 53, the system of Example 52 optionally comprises a system wherein the interface module, in automatically identifying a plurality of domain elements, is to identify a plurality of domain elements using context information.

In Example 54, the system of Example 53 optionally comprises a system wherein the interface module, in identifying the plurality of domain elements using context information, is to identify a plurality of domain elements using information about the relationships between the data object and other business process modeling components.

In Example 55, the system of Example 54 optionally comprises a system wherein the interface module, in identifying the plurality of domain elements using information about the relationships between the data object and other business process modeling components, is to identify a plurality of domain elements using information about another associated data object of the business process modeling element associated to the data object.

In Example 56, the system of Example 53 optionally comprises a system wherein the interface module, in identifying the plurality of domain elements using context information, is to identify a plurality of domain elements using input from the user.

In Example 57, the system of any one or more of Examples 33-56 optionally comprises a system wherein the annotation module, in receiving the definition of the business process modeling component, is to receive a definition of an association between a data object and a business process modeling element of the business process model.

In Example 58, the system of any one or more of Examples 33-57 optionally comprises a system wherein the annotation module, in receiving the association of the domain element with the business process modeling component, is to receive an association of a current state of a data object, a predecessor state of a data object, a successor state of a data object, or a combination thereof, with an association between a data object and a business process modeling element.

In Example 59, the system of any one or more of Examples 33-58 optionally further comprises: an interface module to present the domain element to a user; and wherein the annotation module, in receiving the association of the domain element with the business process modeling component, is to receive a user indication of the association of the domain element with the association between a data object and a modeling element.

In Example 60, the system of Example 59 optionally comprises a system wherein the interface module, in presenting the domain element to a user, is to automatically identify a plurality of domain elements using the domain ontology.

In Example 61, the system of Example 60 optionally comprises a system wherein the interface module, in automatically identifying a plurality of domain elements, is to identify a plurality of domain elements using context information.

In Example 62, the system of Example 61 optionally comprises a system wherein the interface module, in identifying the plurality of domain elements using context information, is to identify a plurality of domain elements using information about the relationships between the association between a data object and a modeling element and other business process modeling components.

In Example 63, the system of Example 62 optionally comprises a system wherein the interface module, in identifying the plurality of domain elements using information about the relationships between the association between a data object and a modeling element and other business process modeling components, is to identify a plurality of domain elements using information about previously defined states of the data object that the association links with the modeling element.

In Example 64, the system of Example 61 optionally comprises a system wherein the interface module, in identifying the plurality of domain elements using context information, is to identify a plurality of domain elements using input from the user.

Example 65 describes a machine-readable medium comprising instructions, which when implemented by one or more processors perform the following operations: receiving a definition of a business process modeling component of a business process model; receiving an association of a domain element, from a domain ontology, with the business process modeling component; and semantically annotating the definition of the business process modeling component using the domain element.

Example 66 describes a system comprising: a means for receiving a definition of a business process modeling component of a business process model; a means for receiving an association of a domain element, from a domain ontology, with the business process modeling component; and a means for semantically annotating the definition of the business process modeling component using the domain element.

In Example 67, the system of Example 66 optionally further comprises: a means for presenting the domain element to a user; and wherein the means for receiving an association of a domain element, from a domain ontology, with the business process modeling component includes a means for receiving a user indication of the association of the domain element with the business process modeling component.

In Example 68, the system of any one or more of Examples 66-67 optionally comprises a system wherein the plurality of domain elements is automatically identified using the domain ontology.

In Example 69, the system of any one or more of Examples 66-68, optionally comprises a system wherein the plurality of domain elements is identified using context information.

In Example 70, the system of Example 69 optionally comprises a system wherein the context information includes information about the relationships between business process modeling components.

In Example 71, the system of any one or more of Examples 69 or 70 optionally comprises a system wherein the context information includes input from the user.

While a number of aspects and embodiments have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope. Furthermore, numerous specific details are set forth for the purposes of explanation in order to provide a thorough understanding of example embodiments. It will be evident to those of skill in the art, however, that the present invention may be practiced without these specific details.

What is claimed is:

1. A method comprising:
receiving a definition of an association link between a data object of a business process model and a modeling element of the business process model, the modeling element representing an activity;
presenting a plurality of domain elements to a user, wherein presenting the plurality of domain elements include presenting a first plurality of domain elements and a second plurality of domain elements, each of the first and the second plurality of domain elements being included in a domain ontology;
receiving a first and a second identification of a domain element from the first and the second plurality of domain elements, the first and the second identification of the domain element being a user selection of the domain element from the first and the second plurality of domain elements wherein the first and the second plurality of domain elements are identified using context information selected from user input and adjacent business modeling components; and
semantically annotating, using a processor, the definition of the association link between the data object and the modeling element using the domain element.

2. The method of claim 1, further comprising identifying the plurality of domain elements to present to the user using the domain ontology.

3. The method of claim 1, further comprising receiving a definition of a business process modeling element of the business process model.

4. The method of claim 3, wherein the domain element is a business process modeling element type associated with a business process modeling element.

5. The method of claim 3, further comprising:
semantically annotating the definition of the business process modeling element using the second identified domain element.

6. The method of claim 1, further comprising receiving a definition of a data object of the business process model.

7. The method of claim 6, wherein the domain element is a data object type associated with a data object.

8. The method of claim 1, wherein the domain ontology provides information about at least one of possible states, possible state transitions, possible preconditions for activities, and possible post-conditions for activities for a business modeling component.

9. The method of claim 1, the domain element is at least one of a current state of a data object, a predecessor state of a data object, or a successor state of a data object associated with the association link between the data object and the modeling element of the business process model.

10. A system comprising:
an annotation module, using a processor, to including a processor configured to:
receive a definition of an association link between a data object of a business process model and a modeling element of the business process model, the modeling element representing an activity;
receive a first and a second identification of a domain element from a first and a second plurality of domain elements, wherein the first and the second plurality of domain elements are identified using context information selected from user input and adjacent business modeling components, the domain element being included in a domain ontology; and
semantically annotate the association link between the data object and the modeling element using the domain element; and
an interface module, using the processor, to present the first and the second plurality of domain elements to a user, wherein the identification of the domain element is a user selection of the domain element from the first and the second plurality of domain elements.

11. The system of claim 10, wherein the interface module, in presenting the domain element to a user, is to automatically identify the plurality of domain elements using the domain ontology.

12. A non-transitory machine-readable medium comprising instructions, which when implemented by one or more processors perform the following operations:
receiving a definition of an association link between a data object of a business process model and a modeling element of the business process model, the modeling element representing an activity;
presenting a plurality of domain elements to a user wherein presenting the plurality of domain elements include presenting a first plurality of domain elements and a second plurality of domain elements, wherein each of the plurality of domain elements is included in a domain ontology;
receiving a first and the second identification of a domain element from the first and the second plurality of domain elements, the identification of the domain element being a user selection of a domain element from the first and the second plurality of domain elements, wherein the first and the second plurality of domain elements are identified using context information selected from user input and adjacent business modeling components; and
semantically annotating the definition of the association link between the data object and the modeling element using the selected domain element.

13. A system comprising:
means for receiving a definition of an association link between a data object of a business process model and a modeling element of the business process model, the modeling element representing an activity;
means for presenting a plurality of domain elements to a user wherein presenting the plurality of domain elements include presenting a first plurality of domain elements and a second plurality of domain elements, wherein each of the plurality of domain elements is included in a domain ontology;

means for receiving a first and a second identification of a domain element, wherein the first and the second identification of the domain element is a user selection of the domain element from the first and the second plurality of domain elements, wherein the first and the second plurality of domain elements are identified using context information selected from user input and adjacent business modeling components; and means for semantically annotating, using a processor, the definition of the association link between the data object and the modeling element using the domain element.

14. The system of claim 13, wherein the plurality of domain elements is automatically identified using the domain ontology.

* * * * *